July 15, 1930. L. W. CHASE ET AL 1,770,569
POWER LIFT
Filed Feb. 5, 1929    3 Sheets-Sheet 1
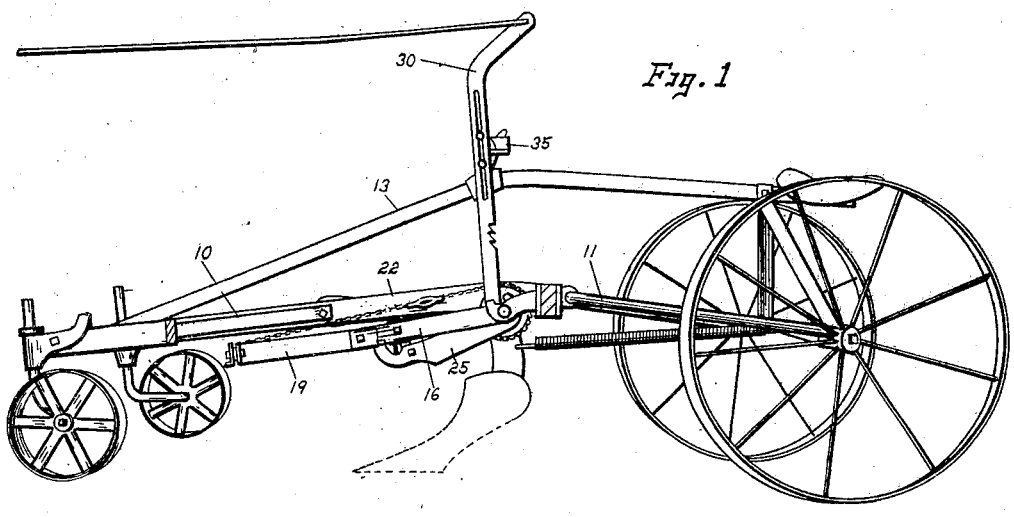
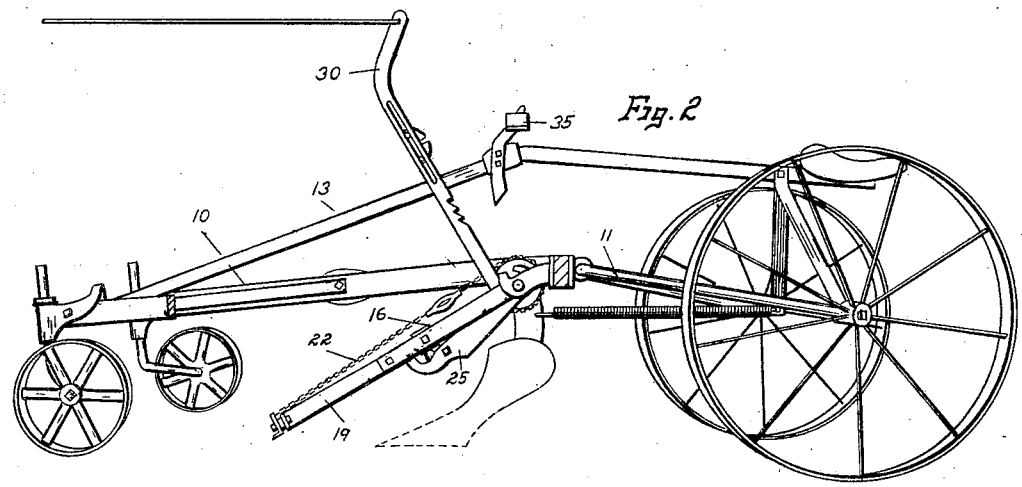
Inventors
L. W. Chase
F. L. Zybach
J. C. Brand
By Emil F. Lange
Attorney

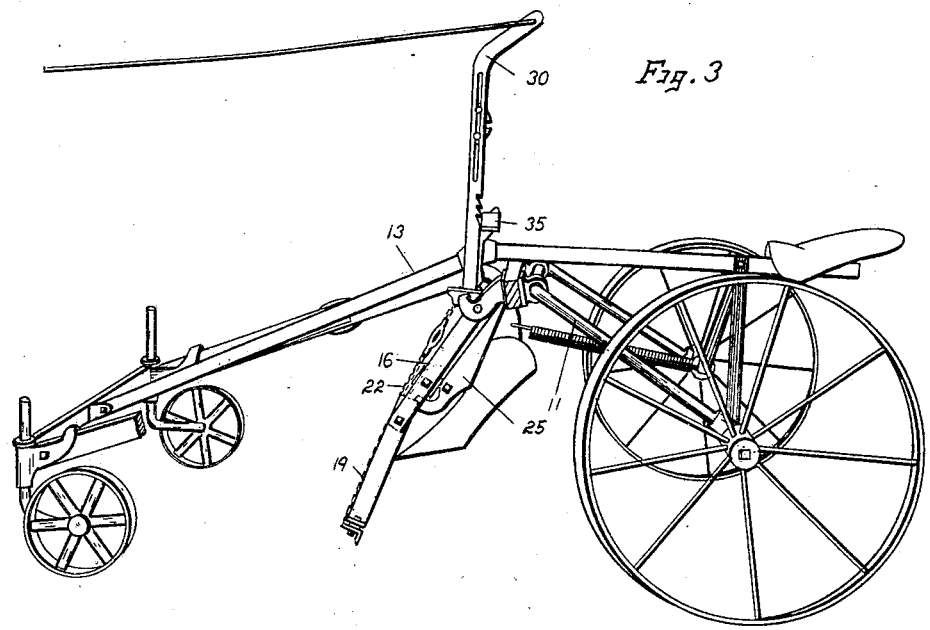
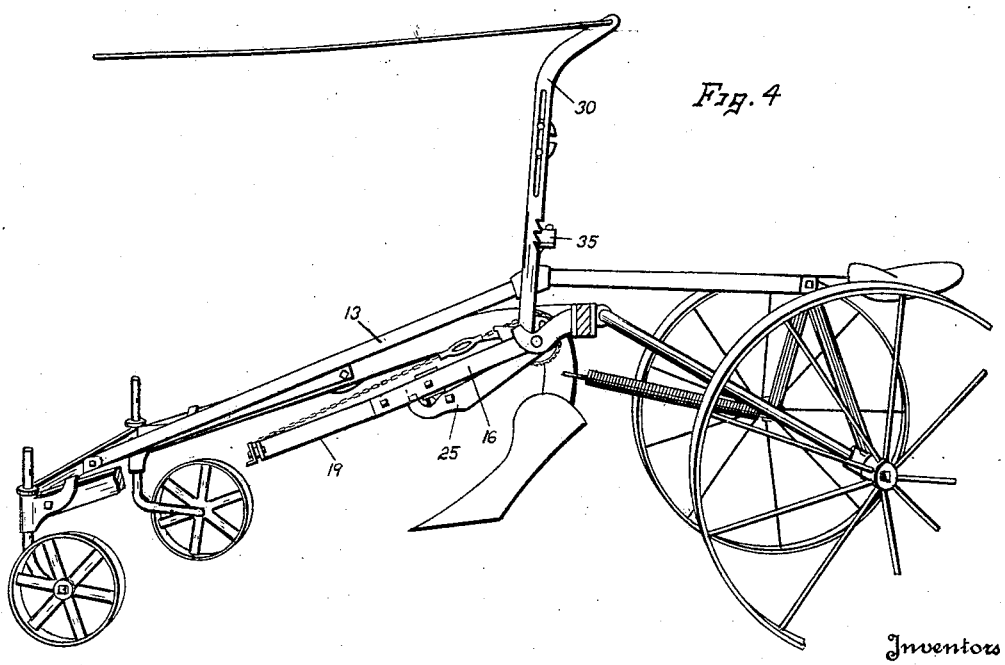

July 15, 1930.  L. W. CHASE ET AL  1,770,569
POWER LIFT
Filed Feb. 5, 1929   3 Sheets-Sheet 3
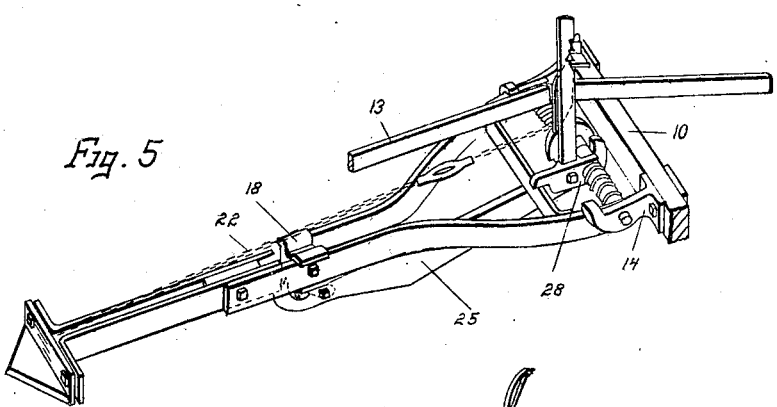
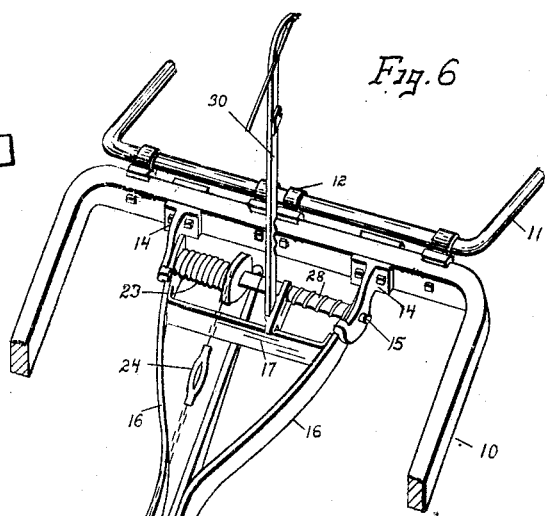
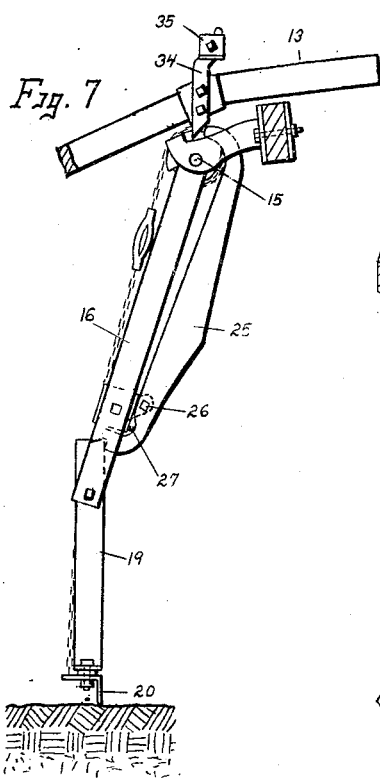
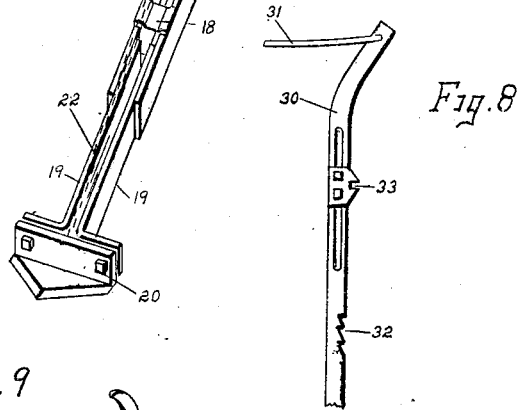
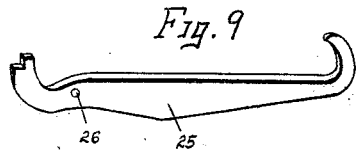
Inventors
L. W. Chase
F. L. Zybach
J. C. Brand
By Emil J. Lange
Attorney Patented July 15, 1930

1,770,569

UNITED STATES PATENT OFFICE

LEON W. CHASE, FRANK L. ZYBACH, AND JAMES C. BRAND, OF LINCOLN, NEBRASKA, ASSIGNORS TO CHASE PLOW COMPANY, OF LINCOLN, NEBRASKA, A CORPORATION OF NEBRASKA

POWER LIFT

Application filed February 5, 1929. Serial No. 337,551.

Our invention relates to plow lifts and especially to plow lifts for automatic operation under traction power.

The primary object of our invention is the provision of a simple mechanism for raising the plows to inoperative position.

Another of our objects is the provision of mechanism for actuating the plow lift, the actuating mechanism serving both to initiate the plow lifting movement and to cause the plows to resume their operative positions, both movements taking place under similar impulses of the actuating mechanism.

Specifically it is our object to provide a plow lift device on the pole vault principle and having structure which arrests the vaulting movement when the plows are out of the ground.

A further object which we have in view is the provision of a stop mechanism for regulating the depth of plowing and another stop mechanism for holding the plows in their inoperative positions, all of the stop mechanisms being automatically operable as the plows are lifted or lowered.

Having in view these objects and others which will be pointed out in the following description, we will now refer to the drawings, in which Figure 1 is a view in slight perspective showing the parts when the implement is in plowing position.

Figure 2 is a similar view but showing the position of the lever immediately after it is unlatched and at the beginning of the leg depressing movement.

Figure 3 is a similar view but showing the leg flexed after the plows have been lifted.

Figure 4 is another view similar to Figures 1, 2 and 3 but showing the implement in the position after the plows have been raised out of the ground.

Figure 5 is a view in perspective showing the structure of the leg with its cooperating parts.

Figure 6 is another perspective view of the leg and cooperating parts, the view being taken at a different angle from that of Figure 5.

Figure 7 is a view in elevation of the leg at the beginning of the flexing movement.

Figure 8 is a view in elevation of the lever which sets in motion the leg operating mechanism.

Figure 9 is a view in slight perspective of the flexing lever.

The lister itself includes a gang of two or more lister plows which are supported at their front ends on caster wheels. The adjacent plow beams are connected and braced by a U-shaped frame 10 which in turn is pivotally connected to a U-shaped frame 11 supported on the rear supporting wheels 12. The transverse portions of the frames 10 and 11 are spaced slightly from each other and the brackets 12 are secured to the frame 10 to provide bearings for the transverse portion of the frame 11. It is obvious that when the implement frame is flexed on the pivots 12 the plows will be raised or lowered. The seat bar 13 is secured to the front frame at its front end and at its rear end is supported in elevated position on a V-shaped frame connected at its extremities with the frame 11.

The plow lift mechanism is best shown in Figures 5 to 9 inclusive to which reference is now made. Secured to the transverse portion of the frame 10 are two forwardly projecting brackets 14 for supporting a shaft 15. The two leg portions 16 are pivotally connected to the brackets 14 with their axes on the shaft 15. The leg portions 16 converge toward their forward extremities and they are maintained in spaced-apart relation by means of the spacing bar 17 and the spacing block 18. The lower leg portions 19 are pivotally secured between the leg portions 16 and their free extremities are outwardly diverging in opposite directions or into double L shape. Secured to the outwardly diverging parts of the leg portions 19 is an L-shaped foot 20 having a V-shaped beveled edge. The brackets 14 are provided with ears overhanging the leg portions 16 to limit the upward pivotal movement thereof.

The shaft 15 has a collar 21, and integral with the collar is a grooved pulley. The chain 22 is secured to both the pulley on the collar 21 and to the foot 20. Surrounding the collar 21 is a coil spring 23 which maintains the chain 22 under tension to keep the leg in its inoperative position. This tension may be adjusted by means of the turnbuckle 24. The function of the chain 22 and of the spring 23 is to maintain the leg portions 16 and 19 in substantially straight line relation and to restore them into straight line relation after they have been flexed.

The flexing lever 25 is pivotally secured at 26 to a downwardly projecting ear on the spacing block 18, as clearly shown in Figure 7. Its longer arm projects in the direction toward the shaft 15 and it bears against the under side of the collar 21. Its forward arm is in contact with the inner end of the leg portions 19 but it is normally kept out of contact with the leg portions 19 by means of the coil spring 27. This spring not only keeps the end of the flexing lever 25 from bearing against the inner end of the leg portions 19 but it keeps the curved end portion of the flexing lever in contact with the collar 21. The forward extremity of the flexing lever 25 is notched to engage the extremity of the leg portions 19, to both initiate the flexing action and to prevent reverse flexing.

Surrounding the shaft 15 is a second collar 28 having a lever 29 integral therewith. Rigidly secured to the lever 29 at its forward extremity is an operating lever 30 having a cord or chain 31 at its free extremity. The lever 30 has several functions, two of which are latching functions for latching the plows in both their operative and inoperative position. This is accomplished by means of a plurality of stop notches 32 and 33 cooperating with the stop 34 on the seat bar 13. The stop notch 33 maintains the parts in position so that the plows will operate at a uniform depth and this stop is adjustable for regulating the depth of plowing. The stop 34 is provided with an L-shaped member 35, the horizontal portion of which is seated in the notch in the stop 33 while the implement is in plowing position. When the parts are in the inoperative position shown in Figure 4, the horizontal portion of the stop 35 is seated in one of the notches 32 of the lever 30.

When the parts are in plowing position, forward movement of the lever 30 will first unlatch the stop 33 and it will then cause the forward end of the lever 29 to bear against the upper edge of the spacing bar 17. There is a slight play between the forward extremity of the lever 29 and the spacing bar 17 in order to permit disengagement of the stops 33 and 35 before further depressing the leg. Further forward movement of the lever 30 then depresses the leg until the foot 20 engages the surface of the soil. At this stage the forward movement of the implement causes the rear end of the frame 10 to move through an arc about the foot 20 as a pivot. The movement of the transverse portion of the frame 10 will be upward and it will carry with it both the plows and the forward portion of the frame 11. This movement if continued would result in the passing of the horizontal portion of the frame 10 over center after which the plows would be restored to plowing position. It is therefore necessary to limit the lifting jack action of the leg when the plows have been lifted out of the ground.

As best shown in Figure 7, the flexing lever 25 contacts with both the rear end of the leg members 19 and with the collar 21 which is the position of the parts during the initial movement. The stop member 34 is provided with a downwardly projecting member having a beveled edge which lies in the path of the rear extremity of the flexing lever 25. As the leg swings about its pivot 15 the curved rear end of the flexing lever comes in contact with the beveled edge of the downward projection from the stop 34. Its action then is to cause the lever to press forwardly at its lower end against the upper end of the foot members 19 to flex the foot members 16 and 19 against the tension of the spring 23. This flexing is only momentary as the spring 23 acting through the chain 22 almost instantly restores the leg members to their straight line relation and inoperative position.

The movement is initiated by a jerk on the cord 31 after which the cord is released. The lever 30 will then instantly spring back into its vertical position under the action of a coil spring surrounding the collar 28. After the parts of the plow frame have been lifted about the pivots 12, the lever 30 will slide against the stop 35 which engages the notches 32 in succession until the lifting movement is automatically interrupted through the action of the flexing lever 25. In other words, the parts will be latched against falling before the leg is restored again to its inoperative position as shown in Figure 4.

From the foregoing description it will be apparent that a simple impulse on the lever 30 will first release the depth regulating stop and then lift the plows to their inoperative position where they are automatically latched. All of this with the exception of the simple initial impulse is accomplished under the traction power of the implement regardless of whether it is horse drawn or tractor drawn. A similar impulse, however, will restore the parts to their operative plowing position. The slight movement of the lever 30 will unlatch the stop member 35 from a notch 32 and the weight of the plows will then carry them down under the movement of the implement into the soil and this downward movement will continue until the stop member 35 automatically engages the notch 33. It will be clear also that the adjustment of the plate in which the notch 33 is located will automatically regulate the depth of plowing.

Attention is called to the fact that in the foregoing description the inoperative relation of the leg members 16 and 19 has been expressed as a straight line relation. This is only approximately true because in actual practice it is deemed advisable to have these two members slightly flexed under the tension of the spring 23 so that the movement to latching operation necessitates a slight movement across dead center.

Having thus described our invention in such full, clear, and exact terms that its construction and operation will be readily understood by others skilled in the art to which it pertains, what we claim as new and desire to secure by Letters Patent of the United States is:

1. A power plow lift comprising a plow frame and a lifting leg pivotally secured to said plow frame, said leg being normally in inoperative position, a plow carried by said plow frame, an adjustable latch on said plow frame for maintaining said plow at a predetermined plowing depth, means for releasing said latch and for then causing the free extremity of said leg to engage the soil whereby the forward travel of the implement raises the plow, and means for automatically restoring said leg to inoperative position when the plow has been raised.

2. A power plow lift comprising a plow frame and a lifting leg pivotally secured to said plow frame, said leg being normally in inoperative position, a plow carried by said plow frame, an adjustable latch on said plow frame for maintaining said plow at a predetermined plowing depth, means for releasing said latch and for then causing the free extremity of said leg to engage the soil whereby the forward travel of the implement raises the plow, means for automatically latching the plow in raised position, and means for automatically restoring said leg to inoperative position when the plow has been raised.

3. A power plow lift comprising a plow frame and a flexing lifting leg pivotally secured to said plow frame, said leg being normally in inoperative position, a plow carried by said plow frame, an adjustable latch on said plow frame for maintaining said plow at a predetermined plowing depth, means for releasing said latch and for then causing the free extremity of said leg to engage the soil whereby the forward travel of the implement raises the plow, means for flexing said leg when the plow has been raised, and means for automatically restoring said leg to inoperative position when the plow has been raised.

4. A power plow lift comprising a plow frame and a flexing lifting leg pivotally secured to said plow frame, said leg being normally in inoperative position, means for causing the free extremity of said leg to engage the soil whereby the forward travel of the implement raises the plow, means for flexing said leg when the plow has been raised and for preventing reverse flexing of said leg, and means for automatically restoring said leg to inoperative position when the plow has been raised.

5. A power plow lift comprising a plow frame and a lifting leg pivotally secured to said plow frame, said leg being normally in inoperative position, adjustable means for latching the plow in plowing position for plowing at a predetermined depth, means for first unlatching the plow and then causing the free extremity of said leg to engage the soil whereby the forward travel of the implement raises the plow, and means for automatically restoring said leg to inoperative position when the plow has been raised.

6. A power plow lift comprising a plow frame and a lifting leg pivotally secured to said plow frame, said leg being formed of two sections in end to end relation and pivotally secured together by a transverse pin, a tension member secured to the plow frame and to the free extremity of said leg for normally holding said leg in inoperative position and for normally preventing the flexing of said leg sections, means for causing the free extremity of said leg to engage the soil whereby forward movement of the implement raises the plow, and means for flexing said leg against the tension of said tension member when the plow has been raised, the arrangement being such that said tension member will restore said leg to inoperative position after the flexing thereof.

7. A power plow lift comprising a plow frame and a lifting leg pivotally secured to said plow frame, said leg being formed of two sections in end to end relation and pivotally secured together by a transverse pin, a tension member secured to the plow frame and to the free extremity of said leg for normally holding said leg in inoperative position and for normally preventing the flexing of said leg sections, means for causing the free extremity of said leg to engage the soil whereby forward movement of the implement raises the plow, and means for flexing said leg against the tension of said tension member when the plow has been raised, said means being operative during the lifting of the plow to prevent flexing of the leg, the arrangement being such that said tension member will restore said leg to inoperative position after the flexing thereof.

8. A power plow lift comprising a plow frame and a lifting leg pivotally secured to said plow frame, said leg being formed of two sections in end to end relation and pivotally secured together by a transverse pin, a tension member secured to the plow frame and to the free extremity of said leg for normally holding said leg in inoperative position and for normally preventing the flexing of said leg sections, means for first releasing said latching means and then causing the free extremity of said leg to engage the soil whereby forward movement of the implement raises the plow, and means for flexing said leg against the tension of said tension member when the plow has been raised, said means being operative during the lifting of the plow to prevent flexing of the leg, the arrangement being such that said tension member will restore said leg to inoperative position after the flexing thereof.

9. A power plow lift comprising a plow frame and a lifting leg pivotally secured to said plow frame, said leg being formed of two sections in end to end relation and pivotally secured together by a transverse pin, a tension member secured to the plow frame and to the free extremity of said leg for normally holding said leg in inoperative position and for normally preventing the flexing of said leg sections, means for causing the free extremity of said leg to engage the soil whereby forward movement of the implement raises the plow, means for automatically latching the plow in raised position, and means for flexing said leg against the tension of said tension member when the plow has been raised, the arrangement being such that said tension member will restore said leg into inoperative position after the flexing thereof.

10. A power plow lift for lister plows of the kind having an implement frame consisting of a front frame and a rear frame pivotally connected together and having a plurality of lister plows rigidly secured to the front frame whereby flexing of the implement frame causes the raising and lowering of the plows, said power lift including a lifting leg pivotally secured to the implement frame at a point in proximity to the pivotal connection between the front and rear frames, said leg being normally in inoperative position, means for causing the free extremity of said leg to engage the soil whereby the forward travel of the implement raises the plows, means for automatically latching the plows in raised position, and means for automatically restoring said leg to inoperative position when the plows have been raised.

11. A power plow lift for lister plows of the kind having an implement frame consisting of a front frame and a rear frame pivotally connected together and having a plurality of lister plows rigidly secured to the front frame whereby flexing of the implement frame causes the raising and lowering of the plows, said power lift including a flexing lifting leg pivotally secured to the implement frame at a point in proximity to the pivotal axis of the front and rear frames, said leg being normally in inoperative position, manually operable means for causing the free extremity of said leg is engage the soil whereby the forward travel of the implement elevates the pivotal connection between the front and rear frames to thereby raise the plows, automatically operable means for flexing said leg when the plows have been raised, means for automatically latching the plows in raised position, and means for automatically restoring said leg to inoperative position after the flexing thereof.

12. A power plow lift for lister plows of the kind having an implement frame consisting of a front frame and a rear frame pivotally connected together on a transverse axis and having a plurality of lister plows rigidly secured to the front frame whereby flexing of the implement frame causes the raising and lowering of the plows, said power lift including a lifting leg pivotally secured to the implement frame at a point in proximity to the pivotal connection between the front and rear frames, said leg being normally in inoperative position, a latch for holding the plows in plowing position, means for first releasing said latch and then causing the free extremity of said leg to engage the soil whereby the forward travel of the implement raises the plows, means for automatically latching the plows in raised position and means for automatically restoring said leg to inoperative position when the plows have been raised.

13. A power plow lift for lister plows of the kind having an implement frame consisting of a front frame and a rear frame pivotally connected together on a transverse axis and having a plurality of lister plows rigidly secured to the front frame whereby flexing of the implement frame causes the raising and lowering the plows, said power lift including a lifting leg having a pair of sections pivotally connected in end to end relation, said lifting leg being secured to the implement frame at a point in proximity to the pivotal connection between the front and rear frames, a tension member secured to the implement frame and to the free extremity of said leg for yieldably maintaining said leg in inoperative position, manually operable means for causing the free extremity of said leg to engage the soil whereby the forward travel of the implement elevates the pivotal connection between the front and rear frames to thereby raise the plows, means for automatically latching the plows in raised position, and automatically operable means for flexing said leg when the plows have been raised, said automatically operable means being operable during the raising of the plows to prevent the flexing of said leg.

14. A power plow lift for lister plows of the kind having an implement frame consisting of a front frame and a rear frame pivotally connected together on a transverse axis and having a plurality of lister plows rigidly secured to the front frame whereby flexing of the implement frame causes the raising and lowering of the plows, said power list including a flexing lifting leg pivotally secured to the implement frame at a point in proximity to the pivotal axis of the front and rear frames, said leg being normally in inoperative position, manually operable means for causing the free extremity of said leg to engage the soil whereby the forward travel of the implement elevates the pivotal connection between the front and rear frames to thereby raise the plows, automatically operable means for latching the plows in raised position, automatically operable means for flexing said leg when the plows have been raised, and means for automatically restoring said leg to inoperative position after the flexing thereof.

In testimony whereof we affix our signatures.

LEON W. CHASE.
FRANK L. ZYBACH.
JAMES C. BRAND.